US009258356B2

(12) United States Patent
Cordes et al.

(10) Patent No.: US 9,258,356 B2
(45) Date of Patent: Feb. 9, 2016

(54) FLOW-DIRECTED COLLABORATIVE COMMUNICATION

(71) Applicant: International Business Machines Corporation, Armonk, NY (US)

(72) Inventors: Steven A. Cordes, Yorktown Heights, NY (US); Debra C. Leach, Salt Point, NY (US); Debra A. Loussedes, Clinton Corners, NY (US); Patrick R. Varekamp, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 13/795,063

(22) Filed: Mar. 12, 2013

(65) Prior Publication Data
US 2014/0280449 A1 Sep. 18, 2014

(51) Int. Cl.
G06F 15/16 (2006.01)
H04L 29/08 (2006.01)
G06F 17/30 (2006.01)

(52) U.S. Cl.
CPC .......... H04L 67/10 (2013.01); G06F 17/30545 (2013.01)

(58) Field of Classification Search
None
See application file for complete search history.

(56) References Cited

U.S. PATENT DOCUMENTS

| 7,403,948 | B2 | 7/2008 | Ghoneimy et al. | |
|---|---|---|---|---|
| 8,479,306 | B1* | 7/2013 | Benson et al. | 726/31 |
| 2003/0229529 | A1 | 12/2003 | Mui et al. | |
| 2006/0259603 | A1 | 11/2006 | Shrader et al. | |
| 2008/0133571 | A1 | 6/2008 | O'Sullivan et al. | |
| 2009/0094074 | A1 | 4/2009 | Nikovski et al. | |
| 2009/0157419 | A1 | 6/2009 | Bursey | |
| 2010/0223557 | A1 | 9/2010 | Kenney et al. | |
| 2011/0106895 | A1* | 5/2011 | Ventilla et al. | 709/206 |
| 2012/0173992 | A1* | 7/2012 | D'Angelo et al. | 715/751 |
| 2014/0101267 | A1* | 4/2014 | Paparizos et al. | 709/206 |

OTHER PUBLICATIONS

IBM Inventors, Technical Disclosure, "Amis: Establishing Association Between Related Workflow Tasks Via Hierarchical Task Model" Feb. 17, 2009 Database: IP.com; IP.com No. IPCOM000179551D, consists of 3 pages.

(Continued)

Primary Examiner — Thomas Dailey
(74) Attorney, Agent, or Firm — Louis Percello

(57) ABSTRACT

A method for resolving a query received from a first node in a network includes accepting, by a second node in the network, ownership of the query from the first node, receiving, at the second node, an identification of a third node in the network, wherein the identification is received from a user of the second node and the user of the second node believes that a user of the third node has information necessary to resolve at least part of the query, and transferring, by the second node, ownership of the at least part of the query to the third node, wherein the accepting, the receiving, and the transferring dynamically generates a data structure that traces a propagation of the query, and the data structure is accessible to an origin of the query.

19 Claims, 3 Drawing Sheets

(56) References Cited

OTHER PUBLICATIONS

IBM Inventors, Technical Disclosure, "Recursive Activity Execution in Workflow Management Systems" Dec. 10, 2003; Database: IP.com; IP.com No. IPCOM0000207130, consists of 3 pages.

IBM Inventors, Technical Disclosure, "Enabling Community Participation for Workflows Through Extensibility and Sharing; Conference Business Process Management Workshops-BPM 2009 International Workflow Tasks Via Hierarchical Task Model"Feb. 17, 2009 Database: IP.Com; IP.Com No. IPCOM000179551D, 10 pages.

* cited by examiner

FLOW-DIRECTED COLLABORATIVE COMMUNICATION

BACKGROUND OF THE INVENTION

The present invention relates generally to collaborative communications, and relates more particularly to flow-directed processes for collaborative communications.

The growing complexity of the modern global business market introduces new challenges to gathering information and solving problems. Critical business decisions often rely on collaboration across broad networks of individuals (e.g., coworkers, customers, vendors, business partners, etc.) who provide information and answers for individual pieces of knowledge that help answer broader questions. The more complex the business, the more collaboration may be necessary to answer a question. Delays introduced by differing time zones may introduce further challenges still in networks that are truly globally integrated.

One conventional solution for rapidly responding to a business need is to organize a meeting (e.g., a teleconference) between the individuals whose input is required. Meetings provide an opportunity for immediate answers to questions and decision making, provided that the right people are involved. However, it may be difficult to ensure that the right people are involved if one does not first know what questions to ask in order to obtain the required information. Moreover, meeting effectiveness also relies on the individuals organizing the meeting to provide a well-defined agenda and to take detailed records.

Another conventional solution for rapidly responding to business needs is electronic mail ("email"). Email allows the primary stakeholder to reach a larger audience more quickly that a meeting, and with less investment of resources (and thus less potential waste). Email also leverages the collective knowledge base, allowing questions to be forwarded to additional individuals who are believed to have the answers. However, since email tends to create an open loop, an answer within a required time frame is not guaranteed (time zone differences may also contribute to this drawback). Moreover, copying and forwarding of email can create divergent threads, making it difficult to reconstruct the history of the original query.

SUMMARY OF THE INVENTION

A method for resolving a query received from a first node in a network includes accepting, by a second node in the network, ownership of the query from the first node, receiving, at the second node, an identification of a third node in the network, wherein the identification is received from a user of the second node and the user of the second node believes that a user of the third node has information necessary to resolve at least part of the query, and transferring, by the second node, ownership of the at least part of the query to the third node, wherein the accepting, the receiving, and the transferring dynamically generates a data structure that traces a propagation of the query, and the data structure is accessible to an origin of the query. For simplicity's sake, the above description makes reference to three nodes to illustrate the concepts of the present invention; however, it will be appreciated that the above-described method may be performed using any number of nodes (including less than three nodes, and more than three nodes), as will be clear from the more detailed description that follows.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention is a method and apparatus for flow-directed collaborative communication. Embodiments of the invention provide solutions (e.g., answers) to queries effectively and efficiently through a controlled series of ownership transfers. Within the context of the present invention, "ownership" of a query (or a response) implies a responsibility for delivery of information. In the event of a problem, this allows the path of the query (or response) to be traced back to a single "owner" at any time.

In particular, the process begins with a base query (e.g., a question or a need), and a workflow is naturally generated with minimal effort, resulting in a highly efficient data stream feeding back to the primary stakeholder (e.g., the query's origin). The speed at which information is provided is maximized, while the work required by any single person in the process is minimized, thereby overcoming barriers of organizational boundaries, time zones, and accessibility.

Figure 1:
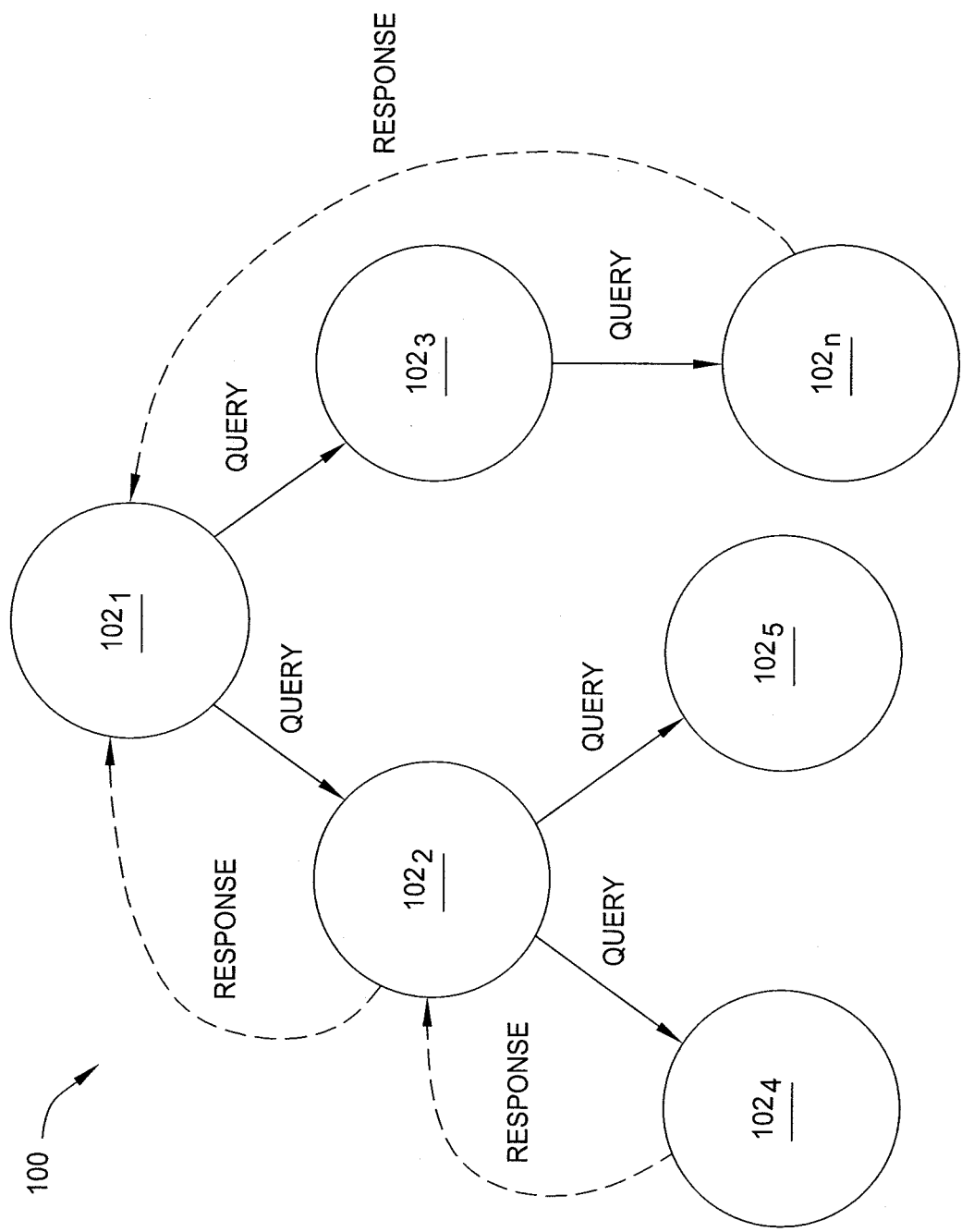
FIG. 1 is a schematic diagram illustrating a portion of an exemplary network within which embodiments of the present invention may be deployed.

FIG. 1 is a schematic diagram illustrating a portion of an exemplary network within which embodiments of the present invention may be deployed. In particular, the portion of the network represents a subset of the network that is involved in responding to a query. As illustrated, the portion of the network comprises a plurality of nodes $102_1$-$102_n$ (hereinafter collectively referred to as "nodes 102," each of which represents a human user (hereinafter, "user" and "node" are used interchangeably to refer to the human user associated with a node). For example, each user may be an employee of a common business entity. The network may comprise additional nodes that are not pictured or do not participate in responding to the query. Any of the nodes 102 may communicate with other nodes 102 in the network (e.g., via email, personal messaging, or the like); communicative links between nodes are indicated by solid and dashed lines in FIG. 1, and explained in further detail below in connection with FIG. 2. Thus, the nodes 102 and the connections between the nodes 102 collectively form a data structure, such as a tree 100. The tree 100 defines a hierarchy in which the nodes 102 in the lower levels of the hierarchy are descendants (e.g., children) of nodes in the higher levels (e.g., parents). The hierarchy merely illustrates the propagation of the query and associated response from user to user and does not necessarily indicate any other relation between the users (e.g., roles in a business entity or the like).

According to embodiments of the present invention, the users represented by the nodes 102 may collaborate in order to form a solution to a query posed by one of the users. As described in further detail below, queries propagate down the tree 100 from originating nodes to one or more nodes who can respond to at least a portion of the query, and responses to the queries propagate upward from the responding nodes back to the originating nodes. Ownership of the queries and responses is transferred as they are forwarded from node to node. Thus, the structure of the tree 100 evolves dynamically as ownership of queries and responses is transferred.

Figure 2:
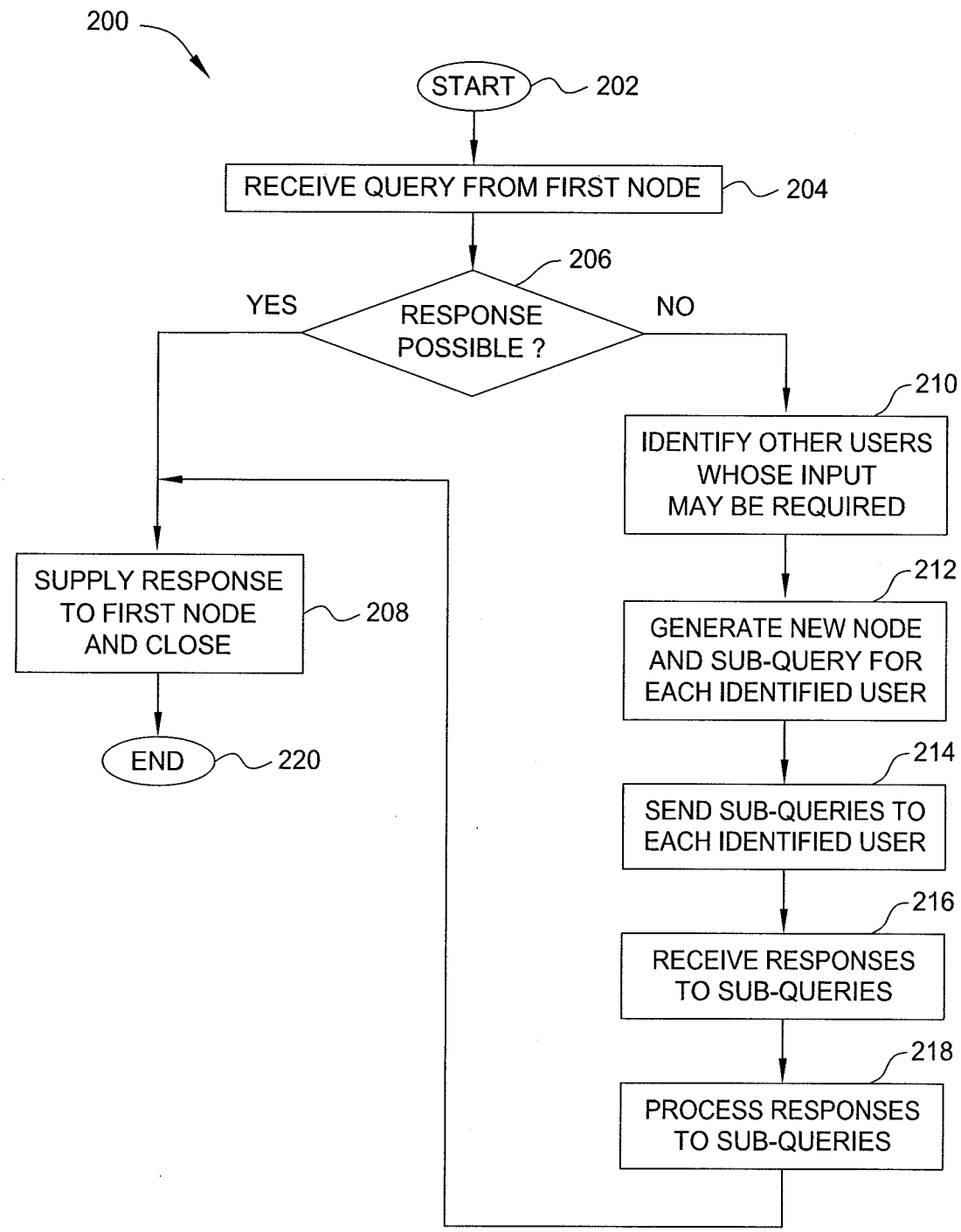
FIG. 2 is a flow diagram illustrating one embodiment of a method for resolving a query, according to the present invention.

FIG. 2 is a flow diagram illustrating one embodiment of a method 200 for resolving a query, according to the present invention. The method 200 may be implemented, for example, at any of the nodes 102 illustrated in FIG. 1. As such, reference is made in the discussion of the method 200 to various elements of FIG. 1. However, the method 200 is not limited by the network configuration illustrated in FIG. 1, which is only exemplary. Progression of the method 200 results in a tree such as the tree 100 illustrated in FIG. 1. For ease of explanation, it is assumed that at least the beginnings of the tree 100 (e.g., including a first node $102_1$ and at least one level of descendant nodes such as the second and third nodes $102_2$ and $102_3$, respectively) have been established at the time that a node 102 invokes the method 200. Thus, the method 200 describes the process of resolving a query from the perspective of an intermediate node 102 that is neither the origin nor the final destination of the query.

The method 200 begins in step 202. In step 204, the second node 102 receives a query. For the purposes of illustration, it is assumed that the node $102_2$ of FIG. 1 is the second node in step 204, although other nodes 102 (e.g., third node $102_3$) may also receive the same query at substantially the same time and perform similar responsive operations to those discussed below. The query originates with an originating node. In the example illustrated in FIG. 1, the first node $102_1$ is the originating node; however, this does not necessarily have to be the case. For instance, the first node $102_1$ may be an intermediate node located between the originating node and the second node $102_2$ in the tree 100. The user of the originating node may be referred to as the "primary stakeholder" of the query, since it is assumed that he (or she) is the individual who requires the information requested by the query.

The query identifies information that the primary stakeholder is seeking (e.g., an answer to a question). The query may also specify additional information, such as a deadline by which a response is required or any restrictions (e.g., confidentiality) associated with the requested information. Furthermore, the query may constrain the form of any response provided (e.g., if the query requests a date, a date may be the only type of response that is permitted). It is noted that the query received by the second node $102_2$ in step 204 may not be identical to the original query sent by the originating node, particularly if the first node $102_1$ is not the originating node. For example, the query received by the second node $102_2$ may be a sub-query of the original query (e.g., seeking only a portion of the information sought by the original query). Alternatively, the first node $102_1$ may not alter the query at all before forwarding the query to the second node $102_2$ (e.g., the first node $102_1$ may believe that the second node $102_2$ will be able to respond to the query in its entirety). Receipt of the query by the second node $102_2$ transfers ownership of the query from the first node $102_1$ to the second node $102_2$. Thus, the user of the second node $102_2$ becomes a "secondary stakeholder" upon receiving ownership of the query. Transfer of ownership may be implied by receipt (e.g., automatic) or may require explicit acceptance by the node 102 to which ownership is being transferred.

In step 206, the user at the second node $102_2$ determines whether he is capable of responding to the query. If the user determines that he is capable of responding to the query, then the method 200 proceeds to step 208. In step 208, the second node $102_2$ (under the direction of the user) supplies a response to the first node $102_1$. The response may optionally include supporting documentation. In one embodiment, if the user of the second node $102_2$ is capable of responding to the query, but is not able to do so immediately (e.g., he may need time to assemble and/or verify information), he may first provide the first node $102_1$ with an estimated deadline by which he expects to respond before providing the actual response. In this case, the deadline provided by the user of the second node $102_2$, as well as any deadlines by which any descendant nodes intend to provide information to the second node $102_2$, must sum together to satisfy any deadline specified by the originating node.

Alternatively, if the user of the second node $102_2$ determines that he is not capable of responding to the query (e.g., he needs more information), then the method 200 proceeds to step 210. In step 210, the user of the second node $102_2$ identifies at least one other user in the network whose input may be required to respond to the query.

In step 212, the second node $102_2$ adds, for each user identified in step 210, a new node 102 in the tree 100. In the example illustrated in FIG. 1, for example, the second node $102_2$ adds a fourth node $102_4$ and a fifth node $102_5$. Each new node 102 is associated with a specific user and a specific query (or "sub-query") for the specific user. The sub-query is associated with the query received by the receiving node $102_2$ in step 204; however, the sub-query may seek only a portion of the information sought by the query received in step 204. In this way, the user of the second node $102_2$ may direct different portions of the query to different users who may have different information and/or expertise, rather than count on the possibility that a single user can respond to the entire query. Each sub-query is subject to any provisions imposed on the original query (and any intervening sub-queries) by the nodes 102 that the original query has traversed to this point (e.g., pertaining to deadline, confidentiality, or the like). Each sub-query is also subject to any additional provisions imposed by the second node $102_2$.

In step 214, the second node $102_2$ sends a message to each of the users for whom a new node has been created. In one embodiment, the message is sent automatically upon addition of the new nodes, as part of the mechanism of the method 200 (e.g., as opposed to requiring some explicit action on the part of the user of the second node $102_2$). The message includes the specific query associated with the specific user of the node to which the message is sent. Thus, ownership of the sub-queries is transferred from the second node $102_2$ to the new nodes that have been created.

In step 216, the second node $102_2$ receives responses back from at least some of the users to whom the messages were sent in step 214. As discussed above, the second node $102_2$ may receive estimated deadlines by which responses can be expected before actual responses are received. In one embodiment, one or more of the responses may include supporting documentation. In one embodiment, a response may comprise an aggregation of responses provided by nodes 102 that are even further down in the hierarchy of the tree 100. In this case, the node from whom the second node $102_2$ receives the response may have received and processed responses to its own sub-queries that it created and sent (e.g., similar to steps 212-214). Ownership of the responses to the sub-queries is transferred from the responding nodes 102 to the second node $102_2$ in step 216. As the ownership is transferred, the responding nodes 102 close (i.e., become inactive in the tree 100).

In optional step 218 (illustrated in phantom), the user of the second node $102_2$ processes the received responses. For instance, the responses may need to be reviewed and/or aggregated by the second node $102_2$ in order to form a proper response to the query received in step 204. In an alternative embodiment, the sub-queries created by the second node $102_2$ may specify that the responses bypass the second node $102_2$ and be delivered directly to the first node $102_1$.

The method 200 then proceeds to step 208, in which the second node $102_2$ delivers a response to the first node $102_1$ as described above. Ownership of the response is transferred from the second node $102_2$ to the first node $102_1$ in step 208. As the ownership is transferred, the second node $102_2$ closes. Depending on how many other nodes the first node $102_1$ sent the query to, the first node $102_1$ may process any responses it receives in a manner similar to that described in connection with step 218.

The method 200 ends in step 220, at least with respect to the second node $102_2$. For any nodes 102 located in higher levels of the hierarchy (such as the first node $102_1$), certain steps of the method 200 may continue (e.g., receiving, processing, and/or delivering responses), until the originating node has received a response to the original query.

Thus, the user of the originating node does not need to know who is capable of responding to the original query; he need only know the next person to whom to send the query to facilitate the response (e.g., a person with direct or indirect access to the information needed for response). Each person to whom the query (e.g., the original query or a sub-query of the original query) is forwarded creates the next portion of the workflow that is required to generate the response. The user of the originating node is constantly aware of the extent of the tree that is being created, of the time frame within which a response is expected, and whether part of the query may have stalled at an unresponsive user. The user of the originating node may modify the tree at any time (e.g., by pruning portions of the structure that are not critical or likely to lead to unacceptable delays, by overriding requested deadlines, or the like).

In one embodiment, queries and responses that are propagated in accordance with the method 200 are sent and delivered through a central server. Thus, the central server tracks and maintains the progress of the original query (and any associated sub-queries) and the development of the tree. This progress and development may be viewable on, for example, a web page that is hosted by the server. In one embodiment, access to the web page is controlled by the nodes 102 that the original query traverses. For example, the originating node may limit to whom its original query (and/or the response to the original query) is visible. Nodes 102 that create sub-queries may further limit to whom the sub-queries (and/or the responses to the sub-queries) are visible. Thus, certain information may be made accessible only to the users to whom the information is directly applicable, thereby avoiding information overload. This also prevents erroneous responses from being propagated further up the tree. However, the full extent of the tree and the timeframe within which a response to the original query can be expected is constantly available to the originating node. Thus, the originating node can solicit status updates from any users who currently have ownership of the query (or an associated sub-query).

The server may also store the tree, so that the same users can be consulted in the future if a similar query is generated. Such a knowledge base may facilitate quicker response to future queries, as well as provide data for statistical analyses of the response process (e.g., detection of anomalies and development of improvements).

Involvement of the server may also facilitate identification of the best methods (e.g., email, text message, etc.) and/or times (e.g., after 5:00 PM, not on weekends) by which to contact specific users who are added as nodes. For instance, the server can record which methods and/or times generate the quickest response and use these methods and/or times as defaults when the users are added as nodes for future queries. The server may also have access to users' calendar applications, which would allow the method 200 to bypass users who may be unavailable within the required timeframe (e.g., on vacation or in a meeting).

Although the method 200 describes certain actions as being taken by the users associated with the nodes 102, in alternative embodiments, these actions may be taken automatically (i.e., without user intervention or assistance) by computing devices operated by the users. For instance, a user's computing device may execute a program that automatically scans the computing device for requested information or automatically forwards queries to other users.

Figure 3:
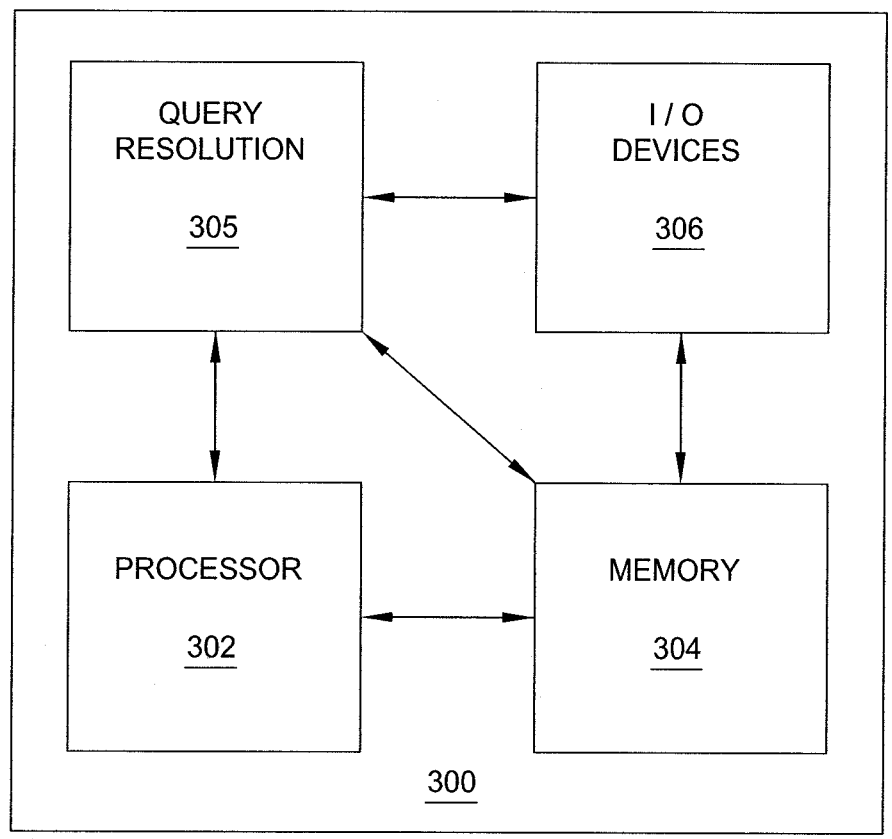
FIG. 3 is a high-level block diagram of query resolution method that is implemented using a general purpose computing device.

FIG. 3 is a high-level block diagram of query resolution method that is implemented using a general purpose computing device 300. In one embodiment, a general purpose computing device 300 comprises a processor 302, a memory 304, a query resolution module 305 and various input/output (I/O) devices 306 such as a display, a keyboard, a mouse, a stylus, a wireless network access card, and the like.

In one embodiment, at least one I/O device is a storage device (e.g., a disk drive, an optical disk drive, a floppy disk drive, a path selection tool, and/or a test pattern generation tool). It should be understood that the query resolution module 305 can be implemented as a physical device or subsystem that is coupled to a processor through a communication channel.

Alternatively, the query resolution module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the query resolution module 305 for generating flow-directed collaborative communications, as described herein with reference to the preceding Figures, can be stored on a non-transitory computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for resolving a query received from a first node in a network, the method comprising:

accepting, by a second node in the network, ownership of the query from the first node;

receiving, by the second node, an identification of a third node in the network, wherein the identification is received from a user of the second node and the user of the second node believes that a user of the third node has information necessary to resolve at least part of the query; and transferring, by the second node, ownership of the at least part of the query to the third node;

accepting, by the second node, ownership of a first response from the third node, wherein the first response contains information responsive to the at least a part of the query; and transferring, by the second node, ownership of a second response to the first node, wherein the second response includes at least some of the information responsive to the at least a part of the query, wherein the accepting ownership of the query, the receiving the identification, the transferring ownership of the at least part of the query, the accepting ownership of the first response, and the transferring ownership of the second response dynamically generates a data structure that traces a propagation of the query, and the data structure is accessible to an origin of the query.

2. The method of claim 1, further comprising, prior to transferring ownership of the second response:

reviewing, by the second node, the first response; and generating the second response in accordance with the reviewing.

3. The method of claim 2, wherein the reviewing comprises:

aggregating the first response with information received by the second node from a fourth node.

4. The method of claim 2, further comprising:

closing, by the second node, wherein the closing renders the second node inactive in the data structure.

5. The method of claim 1, further comprising:

receiving, by the second node prior to receiving the first response, a deadline from the third node, wherein the deadline provides a timeframe within which the third node expects to provide the first response.

6. The method of claim 1, wherein the query is subject to a restriction.

7. The method of claim 6, wherein the restriction comprises a deadline by which the first node requires a response to the query.

8. The method of claim 6, wherein the restriction comprises a limit on with whom the query can be shared.

9. The method of claim 6, wherein the restriction comprises a constraint on a form of a response to the query.

10. The method of claim 6, wherein the at least a part of the query that is transferred to the third node is also subject to the restriction.

11. The method of claim 1, further comprising:

delivering, by the second node, a deadline to the first node, wherein the deadline provides a timeframe within which the second node expects to provide a response to the query.

12. The method of claim 11, wherein the deadline accounts for any further deadlines by which the second node expects to receive a response to the at least part of the query.

13. The method of claim 12, wherein the deadline and the further deadlines sum together to satisfy an original deadline by which the first node requests satisfaction of the query.

14. The method of claim 9, wherein the deadline is alterable by the origin of the query.

15. The method of claim 1, wherein data structure is alterable by the origin of the query.

16. The method of claim 1, further comprising:

imposing, by the second node, a restriction on the query.

17. The method of claim 1, wherein the data structure is stored once the query is resolved.

18. The method of claim 1, wherein the data structure comprises a plurality of nodes including the first node, the second node, and the third node, the plurality of nodes is arranged in a hierarchy that illustrates the propagation.

19. A method for resolving a query received from a first node in a network, the method comprising:

accepting, by a second node in the network, ownership of the query from the first node;

transferring, by the second node, ownership of at least part of the query to a third node in the network;

accepting, by the second node, ownership of a first response from the third node, wherein the first response contains information responsive to the at least a part of the query; and transferring, by the second node, ownership of a second response to the first node, wherein the second response includes at least some of the information responsive to the at least a part of the query, wherein the accepting ownership of the query, the transferring ownership of the at least part of the query, the accepting ownership of the first response, and the transferring ownership of the second response dynamically generates a data structure that traces a propagation of the query, and the data structure is accessible to an origin of the query.

* * * * *